March 8, 1932.   W. B. ALLBRIGHT   1,848,596
CARCASS CLEANSING AND SCALDING APPARATUS
Filed March 3, 1928
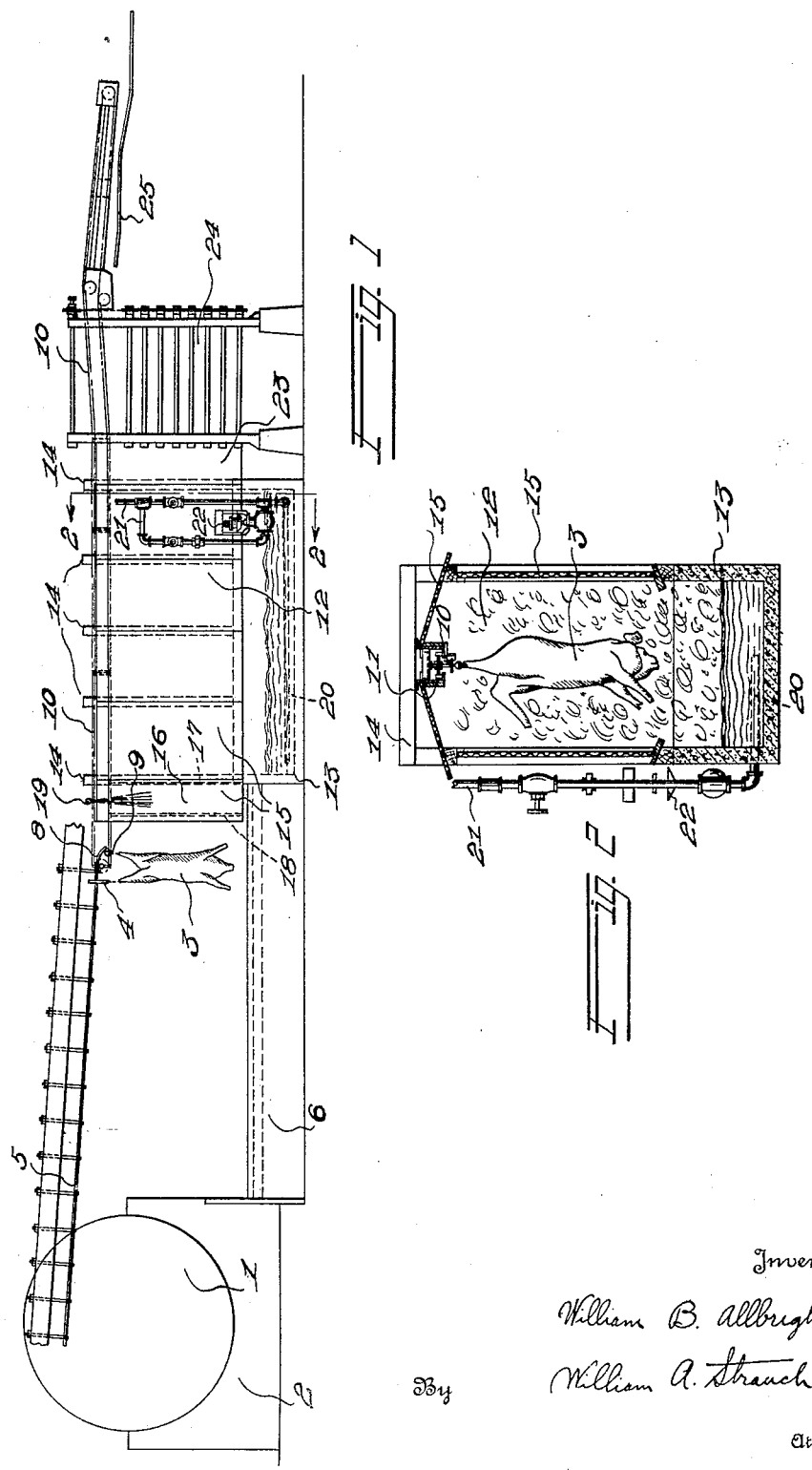
Inventor
William B. Allbright
William A. Strauch
By
Attorney Patented Mar. 8, 1932

1,848,596

UNITED STATES PATENT OFFICE

WILLIAM B. ALLBRIGHT, OF CHICAGO, ILLINOIS, ASSIGNOR TO THE ALLBRIGHT-NELL COMPANY, OF CHICAGO, ILLINOIS, A CORPORATION OF ILLINOIS

CARCASS CLEANSING AND SCALDING APPARATUS

Application filed March 3, 1928. Serial No. 258,830.

The present invention relates to methods and apparatus for cleansing and scalding animal carcasses prior to removing the hair therefrom.

More particularly the invention relates to improved methods and apparatus for scalding hog carcasses prior to passing the carcasses through a dehairing machine. It has been heretofore the practice in large scale packing operations, to drop the hogs from the bleeding rails into scalding tanks containing water at approximately 140° Fahrenheit. Ordinarily from 20 to 60 hogs are in a tank together, the carcasses being dropped into the tanks at one end, floated through the tanks and picked from the tank one at a time and fed into the dehairing machine. As the hogs come from the bleeding rail they are covered with filth and bacteria from the hog pens. The filth and bacteria from the hogs accumulates in the scalding tanks. The temperature of water in the scalding tanks is below the point necessary to sterilize the carcasses and is usually such that bacteriological growth and activity is increased thereby. The contaminated water in the scalding tub enters into the animal carcass through the mouth, nose, eyes, ears, and bung guts, creating unsanitary conditions, and deteriorating the product. Contamination in the scalding tubs is believed to be a source of considerable loss in meats, causing souring of hams, and spoiling of the meat products after the carcasses have been trimmed and dressed.

Accordingly, the primary object of the present invention is to provide a novel cleansing and scalding method and apparatus, particularly adapted for the scalding of hogs in which the common vats or tubs are eliminated, and in which the carcasses are individually cleansed without coming into contact with the filth washed from other carcasses.

Another object of the invention is to provide novel scalding methods and apparatus in which the carcasses are cleansed and scalded without an opportunity for the entry of contaminated and filthy water into the animal carcass during the cleansing and scalding operation; and in which each carcass is individually treated.

A further object of the invention is the provision of novel continuous hog scalding and dehairing methods and apparatus in which the carcasses are thoroughly cleansed, and scalded, and continuously passed through a dehairing machine without necessity of a special operation to transfer the carcasses from the scalding apparatus to the dehairing machine.

Still further objects of the invention are such as will appear from the following detailed description of the preferred forms of the invention, and are as may be attained by a utilization of the various principles, combinations and subcombinations hereinafter set forth and defined by the scope of the appended claims.

As shown in the drawings—

Figure 1 is a more or less diagrammatic side elevation of a preferred form of apparatus for carrying out the invention.

Figure 2 is a sectional view taken along line 2—2 of Figure 1.

Referring to Figure 1, the numeral 1 indicates a hog wheel hoist of any well known type arranged in a pen 2 in which the hogs 3 to be killed are driven in well known manner. A hind leg of each hog to be killed is hooked into a suspended link carried on a traveler 4 which is carried upward by the hoist and transferred to the bleeding rail 5 with the head of the hog hanging downward. As each hog passes over the bleeding tank 6 its jugular vein is pierced and it is permitted then to hang with its head downward at the end of rail 5 until bleeding has ceased. The blood from the hog is caught in the tank 6 and passed to the coagulating tank in well known manner. After the hogs have been bled they are connected at the hog transfer station 8 to a carrier 9 of the moving overhead conveyor 10. Overhead conveyor 10 consists of an endless continuously driven chain arranged to push carriers 9 along an overhead track structure 11 (Figure 2) extending through the top of vapor scalding compartment 12. Compartment 12 is provided with a water pan structure 13 preferably formed of concrete supporting the frame members 14 for the compartment sides and top, and for the overhead conveyor structure. The sides and top of compartment 12 are formed of sheets or panels 15 of corrugated asbestos board or similar material having good heat insulating qualities and resistance to moisture.

Adjacent the inlet end of the compartment 12 is a spray compartment 16 separated from the vapor scalding chamber 12 by a rubber flap partition 17 arranged so that a carcass can be passed therethrough from compartment 16 into compartment 12, with a minimum escape of vapors from compartment 12 into the compartment 16 in operation. The forward end of compartment 16 is closed by a pair of spring doors 18 of any well known construction adapted to swing inward permitting a carcass to enter compartment 16 and then closing in well known manner. Disposed in compartment 16 is a suitable hot water spray arrangement 19 by means of which a cleansing spray of hot water is thrown on the carcasses passing through compartment 16. The spray 19 is of sufficient volume to clean the carcasses as they pass through compartment 16, the bottom of compartment 16 being open so that the water together with the dirt washed from the carcasses passed out of the compartment and is drained away without entering the water pan 13 of compartment 12.

Arranged in the bottom of the water pan 13 is a perforated steam pipe 20 through which steam is injected in the water in the pan to form the scalding vapors in the interior of the compartment 12. Live steam is supplied to pipe 20 through the steam pipe 21 and suitable pressure regulator or temperature control apparatus 22, such for example, as a Powers steam regulator. Disposed adjacent and connected to the outlet end of compartment 12 by the communicating section 23 is a dehairing machine 24 of any suitable type. The overhead conveyor 10 and track structure 11 passes through the dehairing machine 24 in such a way that the carcasses are carried through the dehairing machine 24 head downward suspended in such a way that in operation the rotating beaters of dehairing machine 24 will remove the hair from the carcass in well known manner.

From the dehairing machine the conveyor 10 and track 11 are continued over an overhead track section 25 so arranged that the travelers together with the carcasses are transferred to the overhead section 25 in well known manner, and the scalded and dehaired carcasses pass to the eviscerating tables.

In operation of the mechanism so far described the hog hoist 1, overhead conveyor 10 and dehairing machine 24 are continuously driven in definitely timed relationship. The spraying and scalding chambers must be so proportioned with respect to the speed of operation of the overhead conveyor and the speed of operation of the dehairing machine must be so arranged that as the carcasses pass through the chambers they are properly cleansed and scalded and so that when passed through the dehairing machine the hair is thoroughly removed from the carcass.

The proper relationship of speed of operation of the conveyor and the dehairing machine is preferably secured by driving the mechanism from a common prime mover through suitable driving chains, belts, or gearing in a manner that will be apparent to one skilled in the art, although it will be obvious that separate prime movers properly timed, such for example as individual electric motors properly timed may be used if desired. The hoist 1 is also driven at the proper speed with relation to the rest of the apparatus but for convenience in installation this hoist is preferably driven by an individual prime mover at a speed which will deliver hogs fast enough from the killing and bleeding operation to keep the cleansing and scalding chambers and the dehairing machine operating at full capacity.

Steam is admitted through pipe 21 and the control valve therein and the regulator or controller 22 to the perforated steam pipe. Water is supplied to pan 13 in the bottom of compartment 12 to the level indicated in Figure 2 and heated steam is injected into the water through the perforated pipe 20. As the water is heated vapor is generated which rises into the compartment 12 and the vapor generation is sufficient to displace the air in said compartment through the crevices and end openings thereof so that an atmosphere of hot vapors containing more water vapor than would be necessary to saturate an atmosphere of air in the chamber 12, or what is known as an atmosphere of wet water vapor will exist in chamber 12. The admission of steam is regulated to maintain a temperature of approximately 140 degrees Fahrenheit in compartment 12. Experiments with vapor atmosphere of this kind indicate that an atmosphere substantially uniform in temperature, varying only a few degrees throughout the various parts of the chamber, can be established, and that in such atmosphere the heat conductivity, the transfer properties, and the moisture present is sufficient to efficiently and thoroughly scald carcasses just as effectively as in the prior soaking methods without the attendant contamination.

In compartment 16 a sufficiently heavy washing spray is maintained to thoroughly cleanse the carcasses before they enter chamber 12 to avoid contamination of the water pan 13.

The hogs to be scalded and dehaired are driven into pen 2 where one hind leg of each hog is hooked into the lower link of carrier 4 carried by the hoist 1. Said hoist raises the hogs in succession and transfers them to the track 5 where as they pass over the bleeding tank 6 where the throats of the hogs are pierced. After the hogs have been bled at the transfer station 8 they are successively transferred to carriers 9 and are then carried along the track 11 through compartment 12 where they are cleansed by the spray 19, through the hot atmosphere or wet water vapor of compartment 12 where they are subjected to substantially uniform and proper scalding temperatures and moisture, and are then passed through the dehairing machines at a proper rate to be thoroughly dehaired. They are then transferred to the overhead track 25 where they pass through the eviscerating operation and other usual packing house operations. It will be seen that the carcasses are individually washed and scalded without an opportunity for contamination of healthy carcasses from the filth and bacteria carried by the other carcasses and that there is no opportunity for entry into the carcass of contamination. A thoroughly sanitary and efficient scalding operation is thus provided. In addition, the carcasses are scalded and passed through the dehairing machine without the necessity for manual handling, unlike the prior methods in which the hogs have to be manually transferred from the scalding tubs to the dehairing machine. As a result the cost of labor and operation is diminished. While the scalding and dehairing apparatus may be operated continuously at full capacity a result which has not been heretofore secured by the prior methods of scalding. The scalding with heated water vapors is an important advance in the handling of carcasses, increasing the sanitation, preventing the contamination and spoiling of good meat, and decreasing the cost of operation while increasing the capacity of the apparatus. While the invention has been described in connection with the dehairing machine arranged so that the carcasses may be passed continuously from the scalding chamber to the dehairing machine, it will of course be understood, if desired other types of dehairing machines may be utilized and the transfer of the carcasses from a vapor scalding chamber to different types of dehairing machines from that disclosed, either automatically or manually controlled is contemplated as being within the scope of the invention.

Accordingly, having described a preferred embodiment only of the invention, what is desired to be secured by Letters Patent and is claimed as new is:

1. An apparatus for scalding animal carcasses, including a compartment designed to receive water in the bottom thereof, a steam pipe projecting into said compartment adjacent the bottom thereof and normally covered by the water in said compartment, and means arranged to move a carcass through said compartment above said water, whereby said carcass is scalded by vapor arising from said water.

2. An apparatus for cleaning and scalding hog carcasses, comprising a cleansing compartment and a scalding compartment, a conveyor extending through said compartments and arranged to carry the carcasses successively therethrough, means in said first compartment to flush the carcasses as they pass therethrough to remove dirt adhering thereto, water in said second compartment arranged so that it will be uncontaminated by the operation of said spray, and means within said second compartment to cause vapor to rise from said water as the carcass passes therethrough.

In testimony whereof I affix my signature.
WILLIAM B. ALLBRIGHT.